(12) United States Patent
Min

(10) Patent No.: US 11,942,617 B2
(45) Date of Patent: Mar. 26, 2024

(54) BATTERY MODULE, AND BATTERY RACK AND ENERGY STORAGE SYSTEM INCLUDING THE SAME

(71) Applicant: LG CHEM, LTD., Seoul (KR)

(72) Inventor: Kyoung-Choon Min, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 626 days.

(21) Appl. No.: 17/050,258

(22) PCT Filed: Feb. 27, 2020

(86) PCT No.: PCT/KR2020/002832
§ 371 (c)(1),
(2) Date: Oct. 23, 2020

(87) PCT Pub. No.: WO2020/197111
PCT Pub. Date: Oct. 1, 2020

(65) Prior Publication Data
US 2021/0083344 A1    Mar. 18, 2021

(30) Foreign Application Priority Data

Mar. 25, 2019   (KR) ........................ 10-2019-0033749

(51) Int. Cl.
*H01M 10/6566* (2014.01)
*A62C 2/06* (2006.01)
(Continued)

(52) U.S. Cl.
CPC ......... *H01M 10/6566* (2015.04); *A62C 2/065* (2013.01); *H01M 10/482* (2013.01);
(Continued)

(58) Field of Classification Search
CPC .. A62C 2/065; A62C 3/07; A62C 3/16; A62C 2/06; H01M 10/6566;
(Continued)

(56) References Cited

U.S. PATENT DOCUMENTS

2002/0051340 A1* 5/2002 Oda ................... H01M 50/213
903/903
2006/0068278 A1   3/2006 Bloom et al.
(Continued)

FOREIGN PATENT DOCUMENTS

CN   101689617 A   3/2010
CN   107437631 A   12/2017
(Continued)

OTHER PUBLICATIONS

English Translation of KR 100852727.*
International Search Report (PCT/ISA/210) issued in PCT/KR2020/002832, dated Jun. 17, 2020.

*Primary Examiner* — Kiran Quraishi Akhtar
(74) *Attorney, Agent, or Firm* — Birch, Stewart, Kolasch & Birch, LLP

(57) ABSTRACT

A battery module includes a plurality of battery cells, a module case configured to accommodate the plurality of battery cells, an air intake unit provided to one side of the module case and configured to guide an air into the module case to cool the plurality of battery cells, an air discharge unit provided to the other side of the module case and configured to discharge the air introduced into the module case through the air intake unit to the outside of the module case, and at least one sheet member attached to an inner wall of the module case between the air discharge unit and the air intake unit and configured to expand at a predetermined temperature or above to seal an inner space of the module case.

14 Claims, 10 Drawing Sheets

(51) Int. Cl.
*H01M 10/48* (2006.01)
*H01M 10/613* (2014.01)
*H01M 50/211* (2021.01)
*H01M 50/24* (2021.01)

(52) U.S. Cl.
CPC ....... *H01M 10/613* (2015.04); *H01M 50/211* (2021.01); *H01M 50/24* (2021.01)

(58) Field of Classification Search
CPC ............. H01M 10/482; H01M 10/613; H01M 10/647; H01M 10/627; H01M 10/6561; H01M 50/211; H01M 50/24; H01M 50/209; H01M 50/231; H01M 50/233; H01M 2200/10; H01M 2220/10; H01M 10/48; Y02E 60/10
See application file for complete search history.

(56) References Cited

U.S. PATENT DOCUMENTS

| | | |
|---|---|---|
| 2010/0183910 A1 | 7/2010 | Nishino et al. |
| 2012/0156541 A1 | 6/2012 | Sohn |
| 2012/0231318 A1 | 9/2012 | Buck et al. |
| 2013/0134928 A1 | 5/2013 | Uchihashi et al. |
| 2014/0072844 A1* | 3/2014 | Oh .................... H01M 10/6572 429/71 |
| 2015/0280190 A1 | 10/2015 | Ohshiba et al. |
| 2018/0178675 A1 | 6/2018 | Suzuki et al. |

FOREIGN PATENT DOCUMENTS

| | | | |
|---|---|---|---|
| CN | 207134409 U | 3/2018 | |
| EP | 3 312 931 A1 | 4/2018 | |
| JP | 2002-050412 A | 2/2002 | |
| JP | 2012-230785 A | 11/2012 | |
| JP | 5313048 B2 | 10/2013 | |
| JP | 2015-153616 A | 8/2015 | |
| JP | 5933344 B2 | 6/2016 | |
| JP | 5993209 B2 | 9/2016 | |
| JP | 6252313 B2 | 12/2017 | |
| JP | 2018-098074 A | 6/2018 | |
| JP | 2018-107087 A | 7/2018 | |
| JP | 6365884 B2 | 8/2018 | |
| KR | 10-2005-0092033 A | 9/2005 | |
| KR | 10-0852727 B1 | 8/2008 | |
| KR | 100852727 * | 8/2008 | ............... C09D 5/18 |
| KR | 10-2012-0070274 A | 6/2012 | |
| KR | 10-2014-0034352 A | 3/2014 | |
| KR | 10-2016-0108987 A | 9/2016 | |
| KR | 10-1787460 B1 | 10/2017 | |
| WO | WO 2012/015002 A1 | 2/2012 | |
| WO | WO 2018-062172 A1 | 4/2018 | |

* cited by examiner

BATTERY MODULE, AND BATTERY RACK AND ENERGY STORAGE SYSTEM INCLUDING THE SAME

TECHNICAL FIELD

The present disclosure relates to a battery module, and a battery rack and an energy storage system including the battery cell.

The present application claims priority to Korean Patent Application No. 10-2019-0033749 filed on Mar. 25, 2019 in the Republic of Korea, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module including at least one battery cell first, and then configure a battery pack by using at least one battery module and adding other components. Here, by using the battery pack including at least one battery module, according to various voltage and capacity requirements, an energy storage system may be configured to include battery racks, each having at least one battery pack.

In the case of a battery module used for a conventional energy storage system, a fire-fighting facility is provided to cope with risks such as fire caused by overheating that may occur due to the characteristics of the battery cell in the rack container that accommodates battery racks, each having a plurality of battery modules.

However, if fire starts inside the battery module, it is difficult to quickly extinguish the fire. If the fire is not quickly extinguished in the battery module or delayed to allow fire spreading, the fire may be transferred to surrounding battery modules more rapidly. Accordingly, there is a high possibility that the fire-fighting facility inside the rack container is operated later after damage is generated to the extent that it is difficult to recover.

Therefore, in the event of a fire situation, it is necessary to promptly extinguish the fire more quickly, and for this purpose, it is necessary to extinguish the fire and prevent fire spreading inside the battery module.

DISCLOSURE

Technical Problem

The present disclosure is directed to providing a battery module, which may extinguish fire and prevent fire spreading inside the battery module when a fire situation occurs, and a battery rack and an energy storage system including the battery module.

Technical Solution

In one aspect of the present disclosure, there is provided a battery module, comprising: a plurality of battery cells; a module case configured to accommodate the plurality of battery cells; an air intake unit provided to a first side of the module case and configured to guide an air into the module case to cool the plurality of battery cells; an air discharge unit provided to a second side of the module case and configured to discharge the air introduced into the module case through the air intake unit to the outside of the module case; and at least one sheet member attached to an inner wall of the module case between the air discharge unit and the air intake unit and configured to expand at a predetermined temperature or above to seal an inner space of the module case.

The at least one sheet member may be a plurality of sheet members, and the plurality of sheet members may be attached to a front inner wall, a rear inner wall, both side inner walls, an upper inner wall and a lower inner wall of the module case, respectively.

The plurality of sheet members may be sealed to each other at each side edge.

The battery module may further comprise a pair of air circulation guide members disposed at inner portions of both sides of the module case to face the air intake unit and the air discharge unit, respectively, and each air circulation guide member having an air circulation flow path formed therein.

The pair of air circulation guide members may be made of a same material as the at least one sheet member.

The pair of air circulation guide members may be disposed to face each other with the plurality of battery cells being interposed therebetween.

Each of the pair of air circulation guide members may include a plurality of guide slits provided to one side thereof to face the plurality of battery cells and spaced apart from each other by a predetermined distance.

Each of the pair of air circulation guide members may include a plurality of guide barriers provided adjacent to the plurality of guide.

In addition, the present disclosure further provides a battery rack, comprising: at least one battery module according to the above embodiments; and a rack case configured to accommodate the at least one battery module.

Moreover, the present disclosure further provides an energy storage system, comprising at least one battery rack according to the above embodiments.

Advantageous Effects

According to various embodiments as above, it is possible to provide a battery module, which may extinguish fire and prevent fire spreading inside the battery module when a fire situation occurs, and a battery rack and an energy storage system including the battery module.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
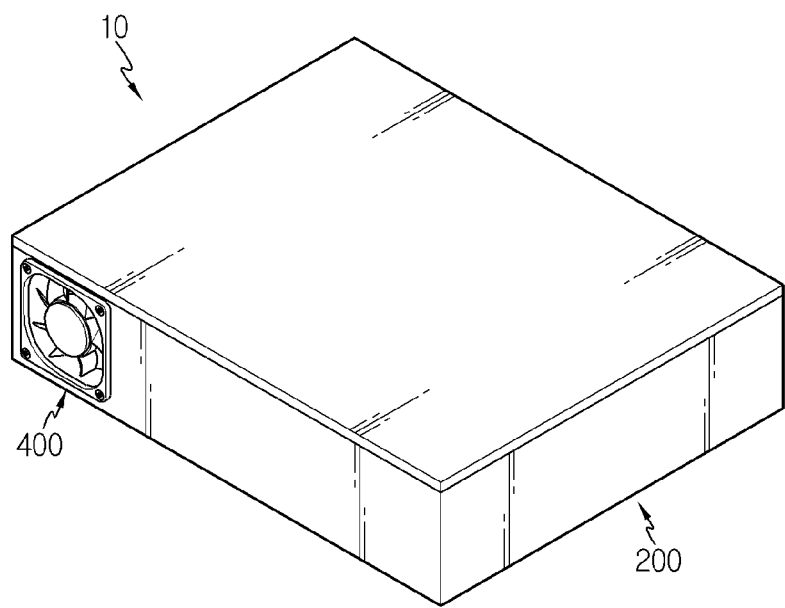
FIG. 1 is a diagram for illustrating a battery module according to an embodiment of the present disclosure.
Figure 2:
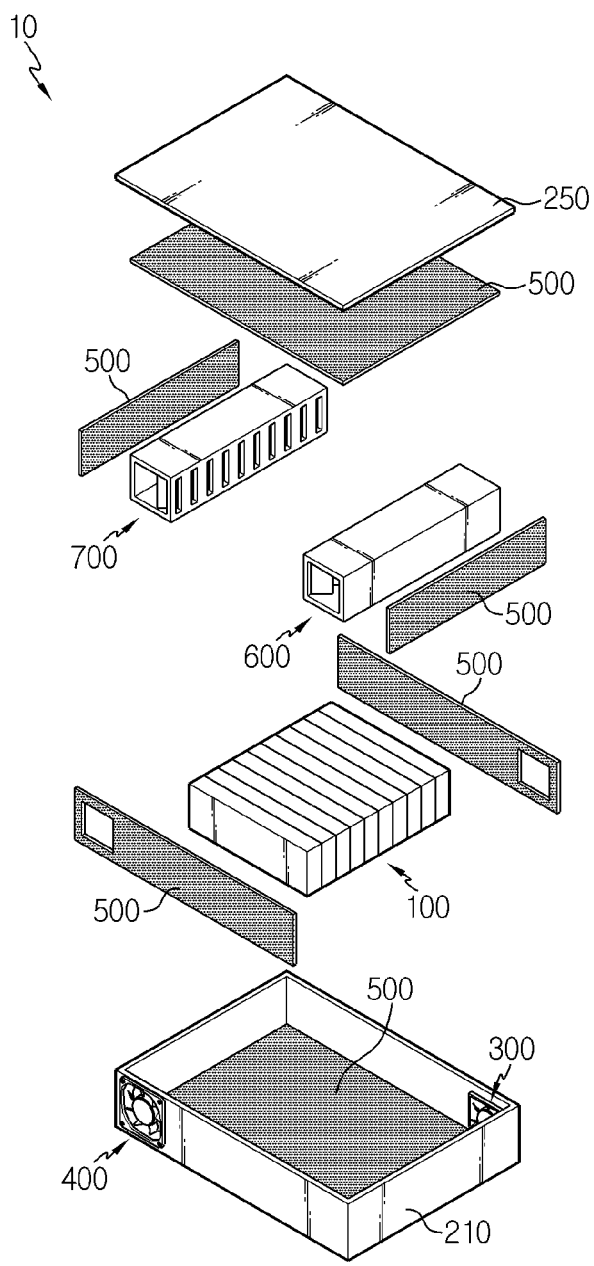
FIG. 2 is an exploded perspective view showing the battery module of FIG. 1.

FIG. 1 is a diagram for illustrating a battery module according to an embodiment of the present disclosure, and FIG. 2 is an exploded perspective view showing the battery module of FIG. 1.

Referring to FIGS. 1 and 2, a battery module 10 may include a battery cell 100, a module case 200, an air intake unit 300, an air discharge unit 400 and a sheet member 500.

The battery cell 100 is a secondary battery and may be provided as a pouch-type secondary battery, a rectangular secondary battery or a cylindrical secondary battery. Hereinafter, in this embodiment, the battery cell 100 will be described as a pouch-type secondary battery.

The battery cell 100 may be provided in plural. The plurality of battery cells 100 may be provided to be stacked on each other. The plurality of battery cells 100 may be electrically connected to each other.

The module case 200 may accommodate the plurality of battery cells 100. The module case 200 may include a case body 210 and a case cover 250.

An accommodation space for accommodating the plurality of battery cells 100 may be provided in the case body 210. The case cover 250 is disposed at an upper side of the plurality of battery cells 100 and may be coupled to the case body 210.

The air intake unit 300 is provided to one side of the module case 200, specifically at a rear side of the case body 210, and may guide air into the module case 200 to cool the plurality of battery cells 100.

The air discharge unit 400 may be provided to the other side of the module case 200, specifically at a front side of the case body 210, to discharge air introduced into the module case 200 through the air intake unit 300 to the outside of the module case 200.

The sheet member 500 is attached to an inner wall of the module case 200 between the air discharge unit 400 and the air intake unit 300 and may expand at a predetermined temperature or above to seal an inner space of the module case 200.

The sheet member 500 may be made of a material that may be expanded at a predetermined temperature or above. For example, the sheet member 500 may be made of a foam-type material whose volume increases at a predetermined temperature or above.

The sheet member 500 may be provided in plural.

The plurality of sheet members 500 may be attached to a front inner wall, a rear inner wall, both side inner walls, an upper inner wall and a lower inner wall of the module case 200, respectively. Specifically, the plurality of sheet members 500 may be attached to a front inner wall, a rear inner wall, both side inner walls and a lower inner wall of the case body 210 and an upper inner wall of the case cover 210. Here, the plurality of sheet members 500 may be sealed at each edge.

Figure 3:
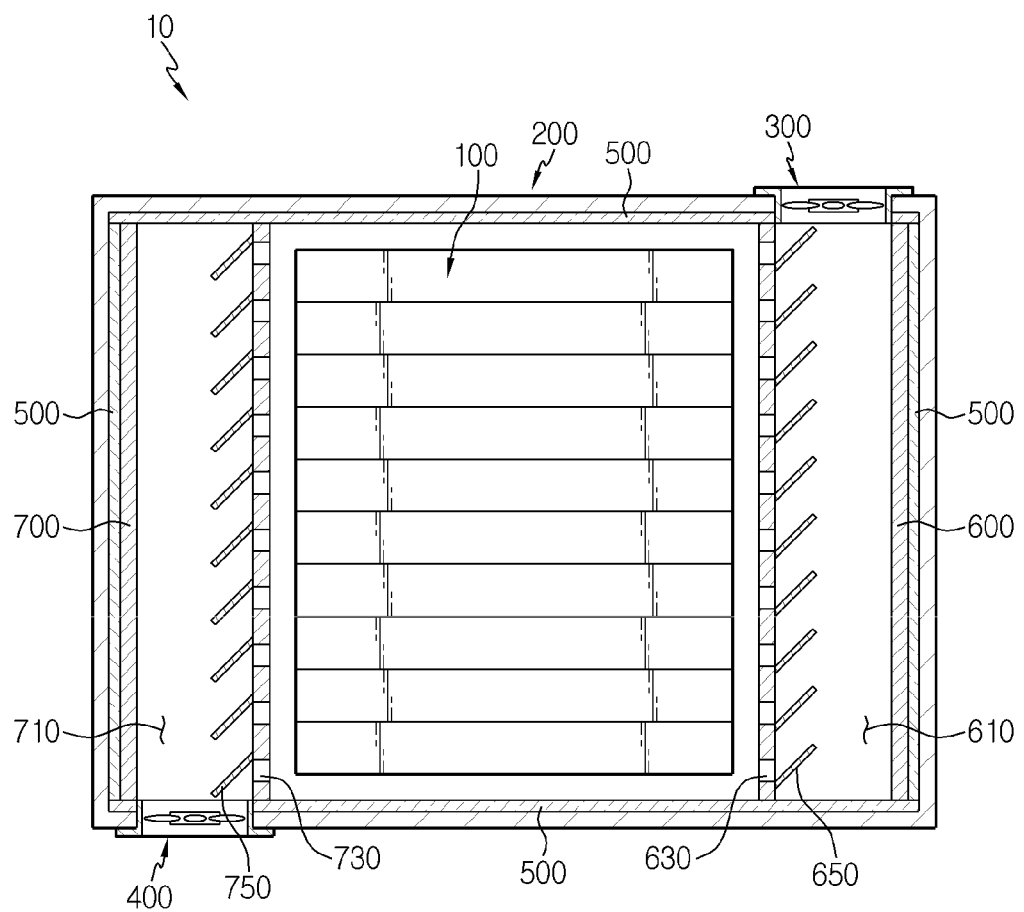
FIG. 3 is a cross-sectional view showing the battery module of FIG. 2.
Figure 4:
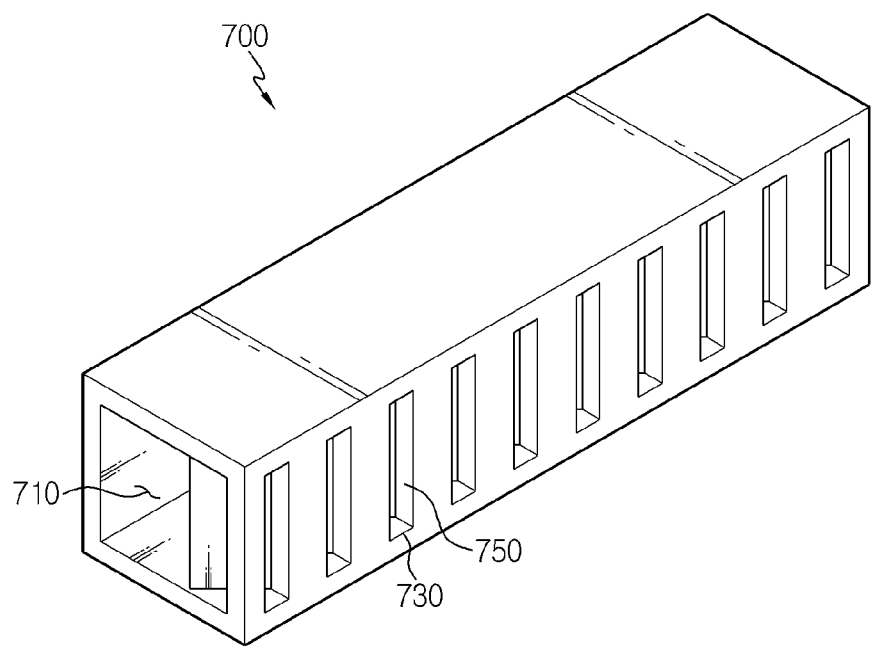
FIG. 4 is a diagram for illustrating an air circulation guide member of the battery module of FIG. 2.
Figure 5:
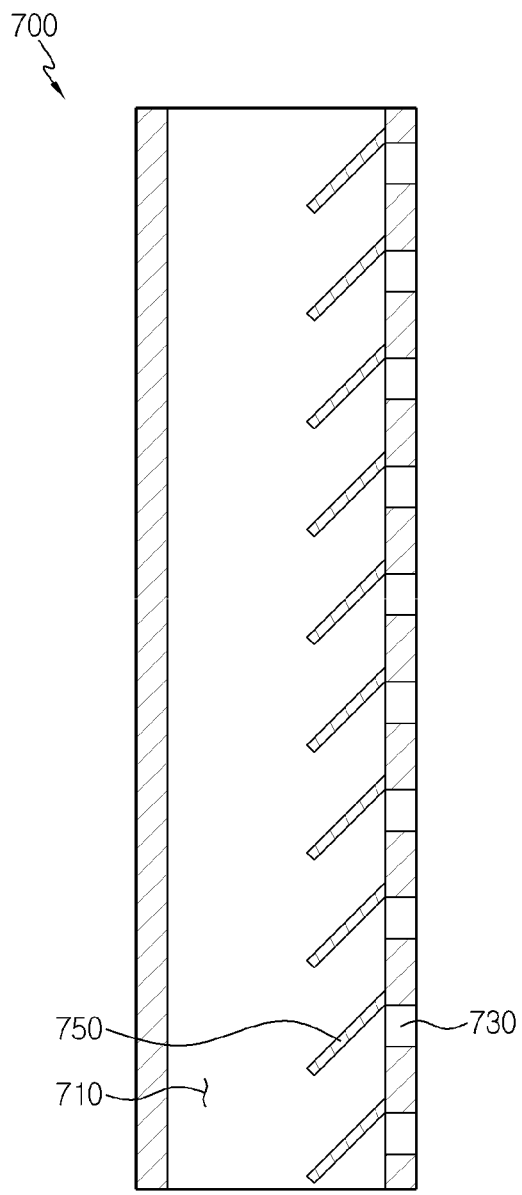
FIG. 5 is a cross-sectional view showing the air circulation guide member of FIG. 4.
Figure 6:
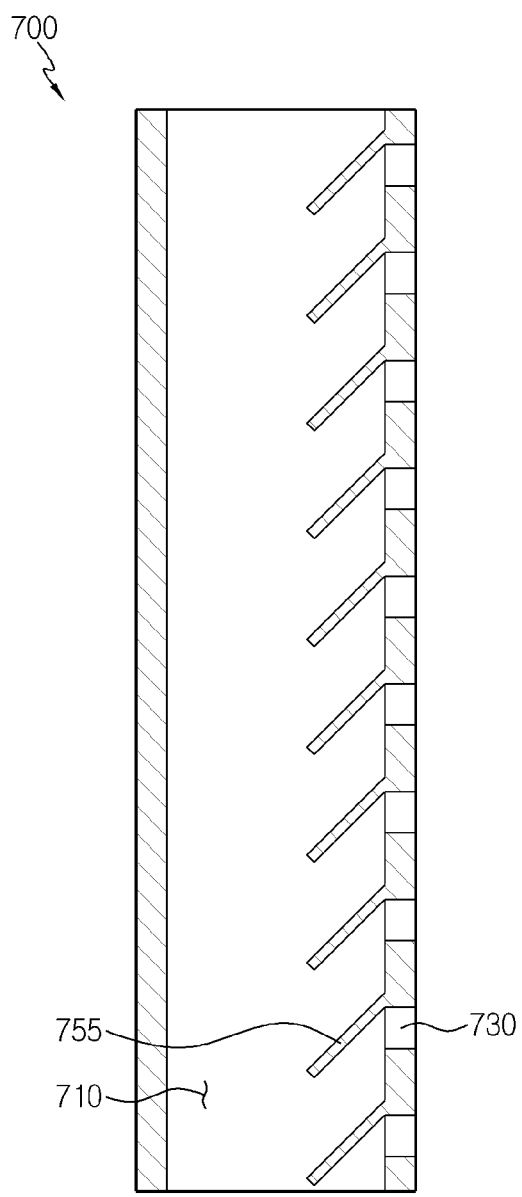
FIG. 6 is a diagram for illustrating another embodiment of the air circulation guide member of FIG. 5.
Figure 7:
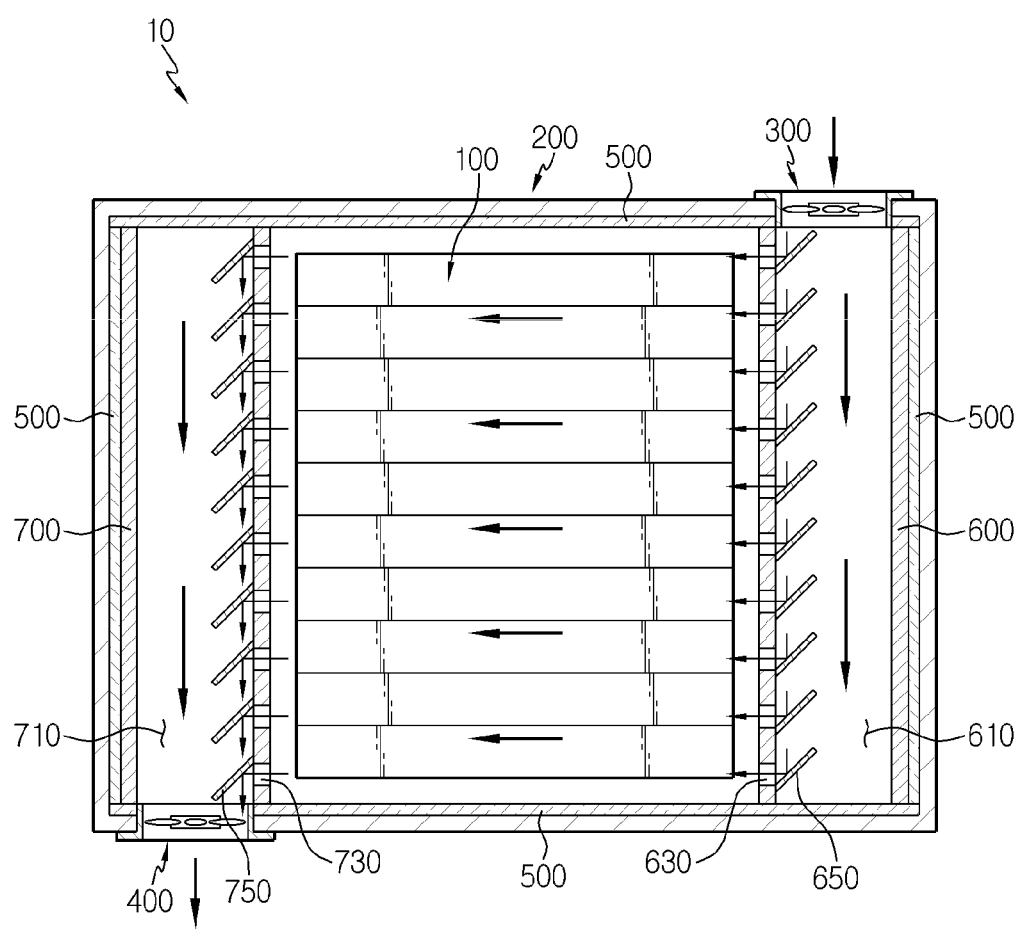
FIG. 7 is a diagram for illustrating air circulation for cooling the battery module of FIG. 1.

FIG. 3 is a cross-sectional view showing the battery module of FIG. 2, FIG. 4 is a diagram for illustrating an air circulation guide member of the battery module of FIG. 2, FIG. 5 is a cross-sectional view showing the air circulation guide member of FIG. 4, FIG. 6 is a diagram for illustrating another embodiment of the air circulation guide member of FIG. 5, and FIG. 7 is a diagram for illustrating air circulation for cooling the battery module of FIG. 1.

Referring to FIGS. 3 to 7, the battery module 10 may further include a pair of air circulation guide members 600, 700.

The pair of air circulation guide members 600, 700 may be disposed at an inner portion of both sides of the module case 200, specifically the case body 210, to face the air intake unit 300 and the air discharge unit 400. Specifically, the pair of air circulation guide members 600, 700 may be disposed to face each other with the plurality of battery cells 100 being interposed therebetween.

The pair of air circulation guide members 600, 700 may be made of the same material as the at least one sheet member 500. That is, the pair of air circulation guide members 600, 700 may also be made of a material that expands at a predetermined temperature or above.

The pair of air circulation guide members 600, 700 may include a first air circulation guide member 600 and a second air circulation guide member 700.

The first air circulation guide member 600 is for guiding air introduced through the air intake unit 300 to the plurality of battery cells 100, and may include an air circulation flow path 610, a guide slit 630 and a guide barrier 650.

The air circulation flow path 610 communicates with the air intake unit 300, and may be elongated along a stacking direction of the plurality of battery cells 100.

The guide slit 630 communicates with the air circulation flow path 610, and may be provided to one side thereof to face the plurality of battery cells 100. The guide slit 630 may be provided in plural. The plurality of guide slits 630 may be arranged to be spaced from each other by a predetermined distance along the stacking direction of the battery cells 100, and may guide the air in the air circulation flow path 610 to move toward the plurality of battery cells 100.

The guide barrier 650 may be provided in plural. The plurality of guide barriers 650 may be disposed adjacent to the plurality of guide slits 630, and may be inclined at a predetermined angle inside the air circulation flow path 610. The plurality of guide barriers 650 may guide the air to be introduced more uniformly toward the plurality of guide slits 630.

The second air circulation guide member 700 is for guiding the air cooling the plurality of battery cells 100 toward the air discharge unit 400, and may include an air circulation flow path 710, a guide slit 730 and a guide barrier 750.

The air circulation flow path 710 communicates with the air discharge unit 400, and may be elongated along the stacking direction of the plurality of battery cells 100.

The guide slit 730 communicates with the air circulation flow path 710, and may be provided to face the plurality of battery cells 100. The guide slit 730 may be provided in plural. The plurality of guide slits 730 may be arranged to be spaced from each other by a predetermined distance along the stacking direction of the battery cells 100, and may guide the air to move from the plurality of battery cells 100 toward the air circulation flow path 710.

The guide barrier 750 may be provided in plural. The plurality of guide barriers 750 are disposed adjacent to the plurality of guide slits 730, and may be included at a predetermined angle inside the air circulation flow path 710. The plurality of guide barriers 750 may guide the air introduced from the plurality of guide slits 730 to move toward the air discharge unit 400 more uniformly.

Meanwhile, the guide barrier 750 may be coupled as a separate member as shown in FIG. 5, or a guide barrier 755 may also be formed as an integral body as shown in FIG. 6.

Figure 8:
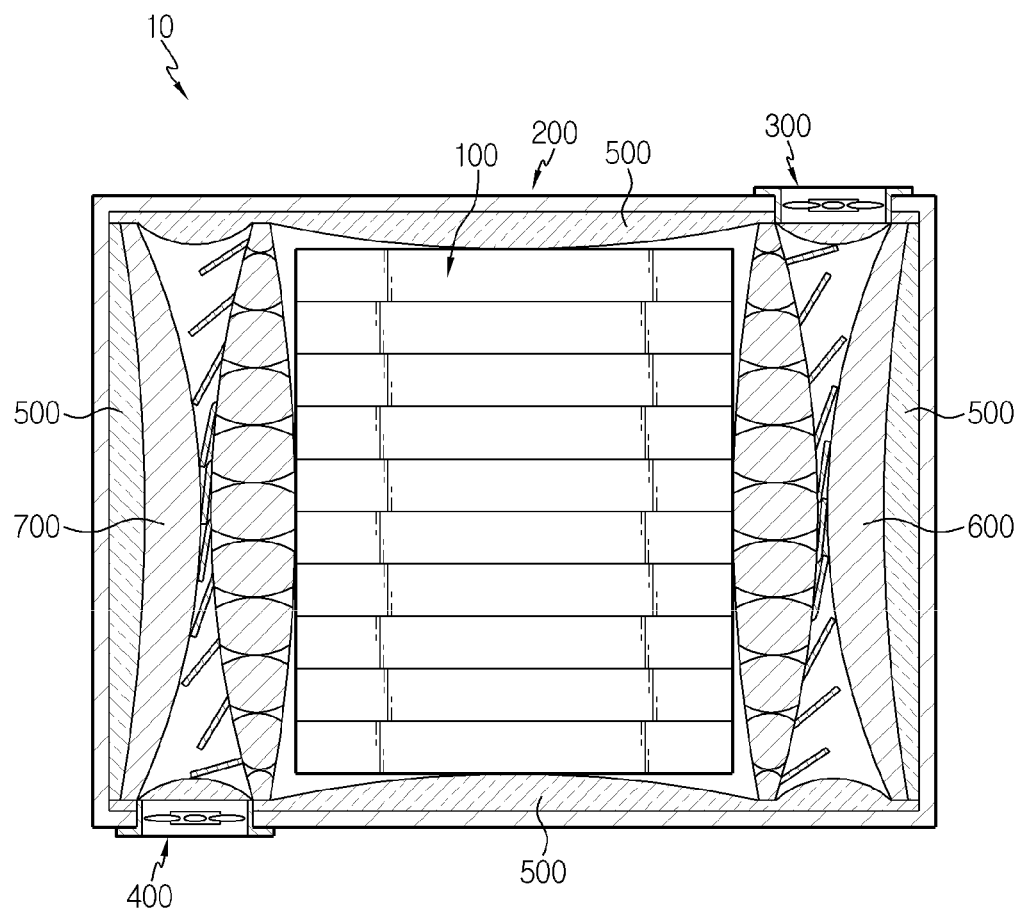
FIG. 8 is a diagram for illustrating an operation of the sheet member and the air circulation guide member when the battery module of FIG. 1 has a predetermined temperature or above.

FIG. 8 is a diagram for illustrating an operation of the sheet member and the air circulation guide member when the battery module of FIG. 1 has a predetermined temperature or above.

Referring to FIG. 8, in the case of the battery module 10, a fire may occur due to overheating in at least one of the plurality of battery cells 100 inside the module case 200.

When such a fire occurs, the temperature inside the module case 200 rises. If the temperature exceeds the predetermined temperature, the plurality of sheet members 500 and the pair of air circulation guide members 600, 700 are expanded to seal the inner space of the module case 200.

As the inner space of the module case 200 is sealed due to the expansion of the plurality of sheet members 500 and the pair of air circulation guide members 600, 700, it is possible to block the introduction of oxygen into the module case 200 at the air intake unit 300 or the air discharge unit 400.

Accordingly, the fire generated inside the battery module 10 may be suppressed more rapidly or weakened significantly, and heat diffusion to the outside of the battery module 10 may be effectively prevented.

Thus, when a fire situation occurs, the battery module 10 of this embodiment may more quickly extinguish the fire or effectively prevent the fire from spreading by using the sheet members 500 and the air circulation guide members 600, 700 at the inside of the battery module 10.

Figure 9:
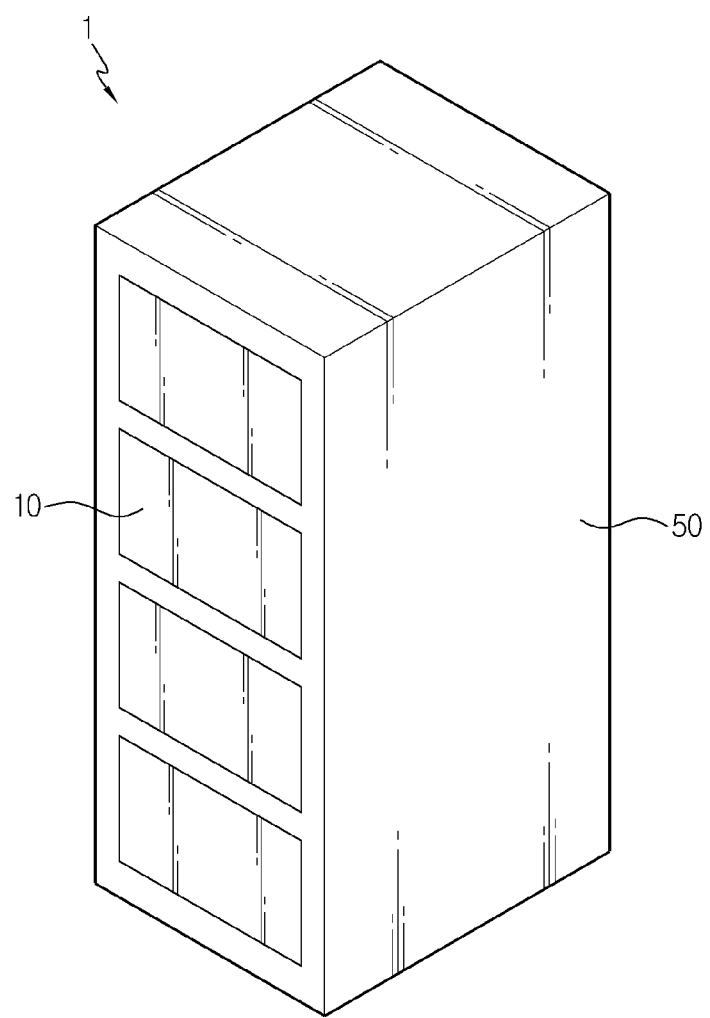
FIG. 9 is a diagram for illustrating a battery rack according to an embodiment of the present disclosure.

FIG. 9 is a diagram for illustrating a battery rack according to an embodiment of the present disclosure.

Referring to FIG. 9, a battery rack 1 may include a plurality of battery modules 10 of the former embodiment and a rack case 50 for accommodating the plurality of battery modules 10.

Since the battery rack 1 of this embodiment includes the battery module 10 of the former embodiment, the battery rack 1 may have all advantages of the battery module 10 of the former embodiment.

In other words, even if a fire situation occurs in any one battery module 10, the battery rack 1 of this embodiment may more quickly seal the inside of the battery module 10 at which the fire situation occurs, thereby quickly extinguishing the fire or effectively preventing the fire from spreading to neighboring battery modules 10.

Figure 10:
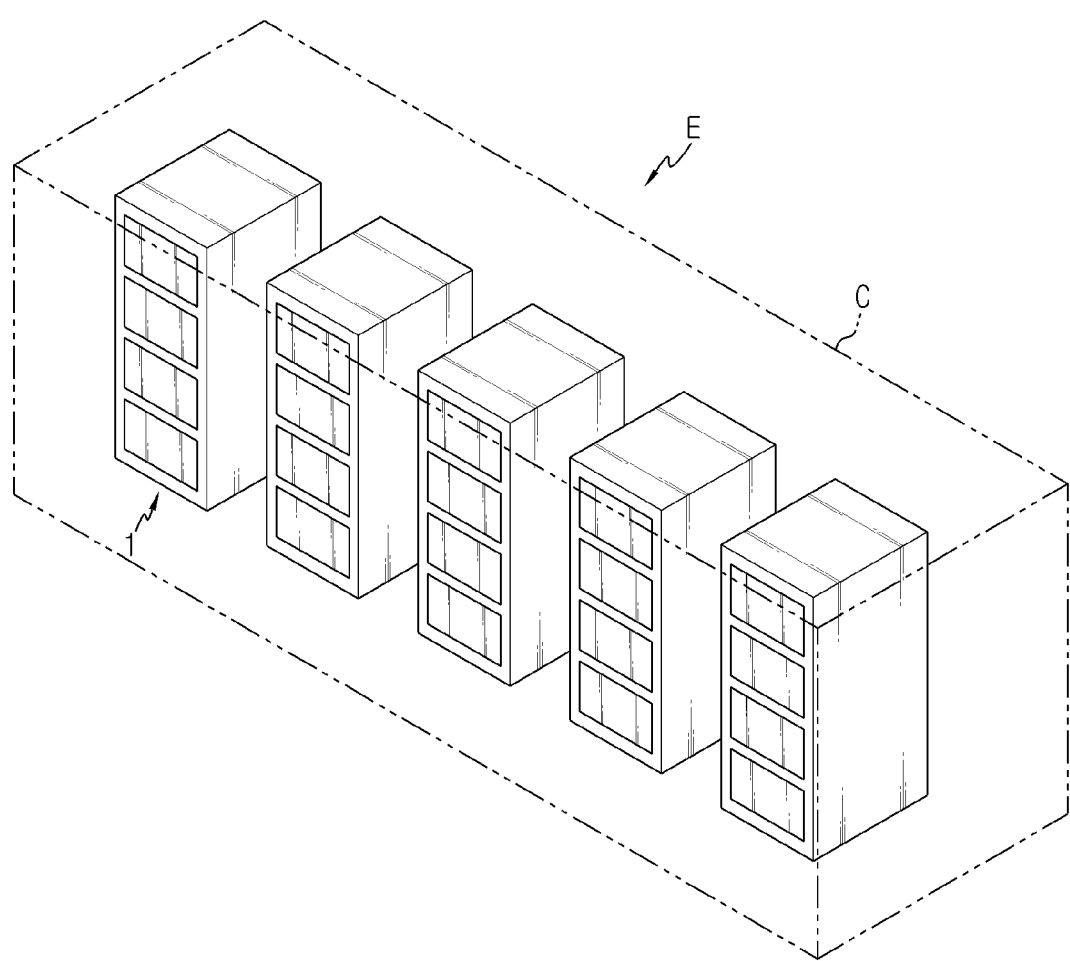
FIG. 10 is a diagram for illustrating an energy storage system according to an embodiment of the present disclosure.

FIG. 10 is a diagram for illustrating an energy storage system according to an embodiment of the present disclosure.

Referring to FIG. 10, an energy storage system E may be used for home or industries as an energy source. The energy storage system E may include at least one battery rack 1 of the former embodiment, or a plurality of battery racks 1 in this embodiment, and a rack container C for accommodating the plurality of battery racks 1.

Since the energy storage system E of this embodiment includes the battery rack 1 of the former embodiment, the energy storage system E may have all advantages of the battery rack 1 of the former embodiment.

According to various embodiments as above, it is possible to provide the battery module 10, which may extinguish fire and prevent fire spreading inside the battery module 10 when a fire situation occurs, and the battery rack 1 and the energy storage system E including the battery module 10.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery module, comprising:
   a plurality of battery cells;
   a module case configured to accommodate the plurality of battery cells;
   an air intake unit provided to a first side of the module case and configured to guide an air into the module case to cool the plurality of battery cells;
   an air discharge unit provided to a second side of the module case and configured to discharge the air introduced into the module case through the air intake unit to the outside of the module case;
   a main flow path between the air intake unit and air discharge unit;
   at least one sheet member attached to an inner wall of the module case between the air discharge unit and the air intake unit and configured to expand above a predetermined temperature to block the main flow path; and
   an air circulation guide member disposed between the air intake unit and the plurality of battery cells, the air circulation guide member having a pair of spaced apart side walls formed from a material configured to expand above the predetermined temperature, wherein the pair of spaced apart side walls comprises a first wall provided with slits and a second wall contacting the at least one sheet member.

2. The battery module according to claim 1, wherein the at least one sheet member is a plurality of sheet members, and wherein the plurality of sheet members are attached to a front inner wall, a rear inner wall, both side inner walls, an upper inner wall and a lower inner wall of the module case, respectively.

3. The battery module according to claim 2, wherein the plurality of sheet members are sealed to each other at each side edge.

4. The battery module according to claim 1, further comprising:

a pair of air circulation guide members disposed at inner portions of both sides of the module case to face the air intake unit and the air discharge unit, respectively, and each air circulation guide member having an air circulation flow path forming part of the main flow path.

5. The battery module according to claim 4, wherein the pair of air circulation guide members are made of a material configured to expand above the predetermined temperature.

6. The battery module according to claim 4, wherein the pair of air circulation guide members are disposed to face each other with the plurality of battery cells being interposed therebetween.

7. The battery module according to claim 6, wherein each of the pair of air circulation guide members includes a plurality of guide slits provided to one side thereof to face the plurality of battery cells and spaced apart from each other by a predetermined distance.

8. The battery module according to claim 7, wherein each of the pair of air circulation guide members includes a plurality of guide barriers provided adjacent to the plurality of guide slits and inclined at a predetermined angle inside the air circulation flow path.

9. A battery rack, comprising:
at least one battery module as defined in claim 1; and
a rack case configured to accommodate the at least one battery module.

10. An energy storage system, comprising:
at least one battery rack as defined in claim 9.

11. The battery module according to claim 1, wherein the at least one sheet member and the air circulation guide member are formed from a same material.

12. The battery module according to claim 1, wherein the at least one sheet member blocks one of the air intake unit and air discharge unit when expanded.

13. The battery module according to claim 1, further comprising an air circulation guide member disposed between the air intake unit and the plurality of battery cells.

14. The battery module according to claim 1, wherein the at least one sheet member is a foam material.

* * * * *